March 31, 1964 J. A. DEVER 3,127,524

ELECTRICAL APPARATUS

Filed March 27, 1961

2 Sheets-Sheet 1

INVENTOR.
JOHN A. DEVER

BY Arthur H. Swanson

ATTORNEY.

March 31, 1964 J. A. DEVER 3,127,524

ELECTRICAL APPARATUS

Filed March 27, 1961 2 Sheets-Sheet 2

INVENTOR.
JOHN A. DEVER
BY Arthur H. Swenson
ATTORNEY.

3,127,524

ELECTRICAL APPARATUS

John A. Dever, Philadelphia, Pa., assignor to Minneapolis-Honeywell Regulator Company, Minneapolis, Minn., a corporation of Delaware Filed Mar. 27, 1961, Ser. No. 98,404
2 Claims. (Cl. 307—88.5)

This invention relates to amplifiers. More specifically, the present invention relates to decision amplifiers.

An object of the present invention is to provide an improved polarity-decision amplifier.

Another object of the present invention is to provide an improved polarity-decision amplifier which is characterized by the ability to detect the polarity of an input signal having a variable amplitude.

A further object of the present invention is to provide an improved polarity-decision amplifier for detecting the instantaneous polarity of a signal having a rapidly fluctuating polarity.

A still further object of the present invention is to provide an improved polarity-decision amplifier, as presented herein, which is characterized by a simplicity of operation and construction.

In accomplishing these and other objects, there has been provided, in accordance with the present invention, a polarity-decision amplifier having an input gating circuit which is used to sample an input signal by selectively applying the input signal to an amplifying circuit. An output signal from the amplifying circuit representative of the input signal is applied to an output gating circuit. The output gating circuit is selectively operated with relation to the input gating circuit to apply the output signal to a bistable circuit for sensing the polarity of the sampled input signal. A common signal generator is used to apply bias signals to the input and output gating circuits whereby to maintain an isolated condition of the bistable circuit except during the time interval for sampling the input signal.

A better understanding of the present invention may be had from the following detailed description, in which.

Figure 1:
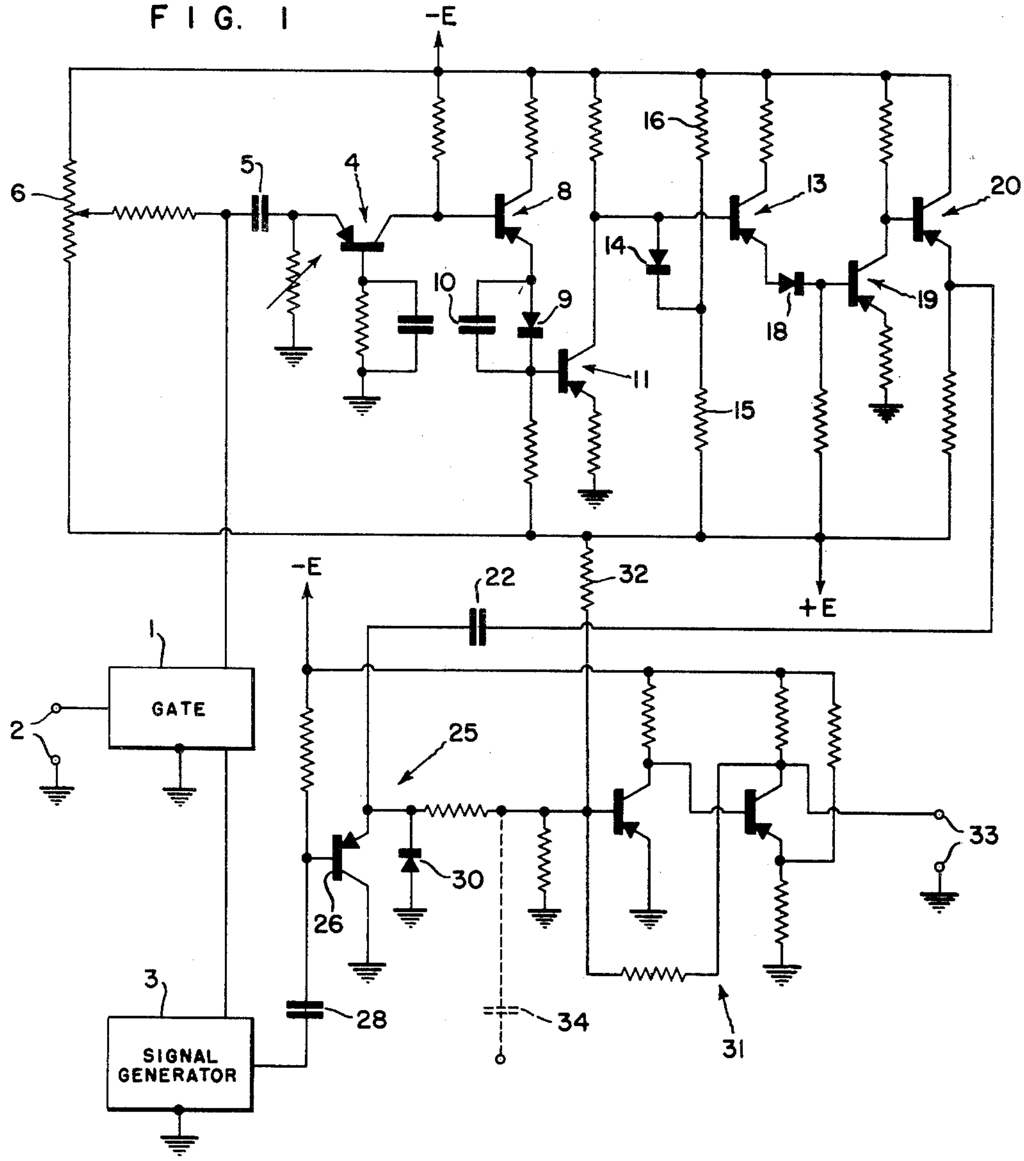
FIG. 1 is a schematic illustration of a polarity-decision amplifier embodying the present invention.

Referring to FIG. 1 in more detail, there is shown a polarity-decision amplifier having an input signal gate circuit 1. A pair of input terminals 2 are provided for connecting a source of input signals to the gate circuit 1. The gate circuit 1 is periodically energized by a signal generator 3 to effect the transmission therethrough an input signal from the input terminals 2. These gated input signals are applied to the emitter of a common-base transistor circuit 4 through a first coupling capacitor 5. A potentiometer 6 is connected between a negative signal source −E and a positive signal source +E with its slider connected to the input side of the coupling capacitor 5 to supply a variable signal to the circuit whereby an operating level signal for the gated input signals is obtained.

The transistor circuit 4 is arranged with its base connected to a ground terminal and is energized by the source of energizing signal −E to the collector thereof. An output signal from the collector of the transistor circuit 4 is directly coupled to the base of a first common emitter transistor stage 8. This first common emitter circuit 8 has a first zener diode 9 with a bypass capacitor 10 in the emitter connection to the positive source +E whereby to effect a coupling of an emitter circuit signal. This emitter signal is applied to the base of a second common emitter transistor stage 11. The collector of the second common-emitter stage 11 is energized by the negative source −E and is arranged with its emitter connected to a ground terminal. An output signal from the collector of the second stage 11 is applied to the base of a third common emitter transistor stage 13. A diode 14 is connected between this base and a source of a reference signal to limit the amplitude of the signal applied to the base. The reference signal is obtained from a voltage divider comprising a pair of resistors 15 and 16 connected in series between the negative source −E and the positive source +E.

The collector of the third stage 13 is connected to negative source −E. The emitter of the third stage 13 is connected through a second zener diode 18 to the positive source +E. The signal zener diode 18 is effective to couple an emitter signal from the third stage 13 to the base of a fourth common emitter transistor stage 19, which has its collector energized by the negative source −E, and which has its emitter connected to a ground terminal. An output signal from the collector of the fourth stage 19 is applied to the base of a fifth transistor stage 20. The collector of the fifth stage 20 is energized by the negative source −E and is arranged with its emitter connected to the positive source +E.

A second coupling capacitor 22 is used to apply an output signal appearing at the emitter of the fifth stage 20 to an output gate circuit 25. This output signal is applied to the emitter of a gate transistor 26. The collector of the gate transistor 26 is connected to a ground terminal. The base of the transistor 26 is connected to the negative source −E and is connected by a third coupling capacitor 28 to the signal generator 3. The signal generator 3 is effective to apply a gating signal to the gate transistor 26. A signal from the emitter of the transistor 26 is limited by a limiting diode 30 and is directly applied to a bistable circuit 31. A bias signal from the positive source +E is applied to the bistable circuit 31 through a bias resistor 32. An output signal from the bistable circuit 31 representative of the state thereof is applied to a pair of output terminals 33 to indicate the condition of the bistable circuit 31. A coupling capacitor 34 may be used to couple a reset signal to the bistable circuit 31 whereby to reset the circuit 31 to a reference state after the application of a gated signal from the output gate circuit 25.

Figure 2:
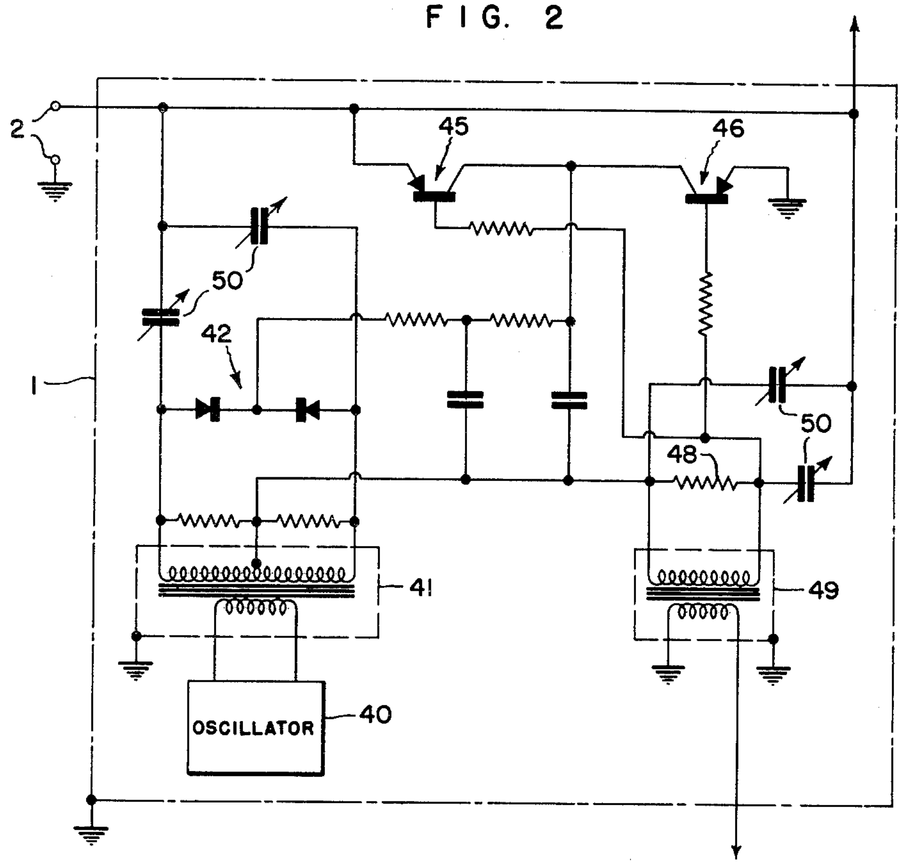
FIG. 2 is a schematic illustration of a gate circuit suitable for use with the amplifier shown in FIG. 1.

In FIG. 2, there is shown a gate circuit suitable for use as the gate circuit 1 shown in FIG. 1. An oscillator 40 is used to supply a high frequency signal to the primary winding of a first pulse transformer 41. The secondary winding of the transformer 41 is connected to a full-wave rectifier and filter network 42 to produce a unidirectional bias signal. This bias signal is applied to an input gate circuit comprising a pair of transistors 45 and 46. The emitter of a first transistor 45 is connected to an input terminal 2. The collector of this transistor is connected to the collector of a second transistor 46 which has its emitter connected to a ground terminal. One side of the network 42 is connected to the collectors of the transistors 45 and 46. The other side of the network 42 is connected to the bases of the first and second transistors 45 and 46 through a load resistor 48. The load resistor 48 is connected across a secondary winding of a second pulse transformer 49. The primary winding of the second transformer 49 is connected to the signal generator 3. A plurality of variable capacitors 50 are used to connect the ends of the secondaries of the first and second transformers 41 and 49 to an input terminal 2. These capacitors are adjusted to balance out any transient currents applied to the input terminal 2 which currents are generated as a result of the operation of the transformers 41 and 49.

Assume an input signal is applied to the input terminals 2 having an instantaneous polarity which is to be detected by the polarity-decision amplifier of the present invention. The gate circuit 1, shown in FIG. 2, is effective to control the transmission of the input signal by providing a bypass path through the first and second transistors 45 and 46. Thus, the oscillator 40 and the rectifier circuit 42 is effective to supply a bias signal to the first and second transistors 45 and 46 which signal is arranged to maintain these transistors in a conducting state. The applied input signal, accordingly, is bypassed to a ground terminal and is not applied to the further circuitry of the present invention.

An energizing signal from the negative source −E is supplied to the gate transistor 26 to maintain this transistor in a conducting state. Thus, the output gate circuit 25 is effecive to bypass any signals coupled thereto by the coupling capacitor 22 to a ground terminal. Accordingly, the bistable circuit 31 is effectively isolated from any input signals to allow it to remain in an existing operating state.

The input signal applied to the input terminals 2 may be sampled by the polarity-decision amplifier of the present invention by applying a signal from the signal generator 3 to the primary of the second transformer 49. This signal is effective to produce a bias signal across the load resistor 48. This bias signal is arranged to oppose the bias signal from the rectifier circuit 42. The net bias signal applied to the first and second transistors 45 and 46 is effectively reduced to an amplitude which is insufficient to maintain the conducting state of these transistors. The disruption of the bypass path is effective to permit the application of the input signal to the first transistor circuit 4 through the first capacitor 5 to be amplified thereby and by the succeeding transistor stages 8, 11, 13, 19 and 20. The amplified input signal is finally applied to the output gate circuit 25 by the second coupling capacitor 22.

The signal generator 3 is arranged to terminate the effect of the energizing signal to the gate transistor 26 by supplying a signal in opposition to the energizing signal. The discontinuence of the effect of the energizing signal terminates the conducting state of the gate transistor 26. The amplified input signal is now applied to the bistable circuit 31. The polarity of this input signal will determine its effect on the bistable circuit 31. Thus, if the polarity is the same as that of a previously applied input signal, the bistable circuit 31 will remain in its present conducting state. Conversely, if the polarity of the present signal is opposite to that of a prior input signal, the bistable circuit 31 will reverse its conducting state; i.e., the conducting and non-conducting states of the two transistors thereof will be reversed. A signal level representative of the state of the bistable circuit 31 is coupled to the output terminals 33 as an output signal corresponding to the relative polarity of the input signal. A termination of the sampling of the input signal is effected by terminating the signals applied to the second transformer 49 and to the gate transistor 26 whereby to restore the aforesaid conducting states thereof. The signal generator 3 is arranged to restore the effect of the energizing signal to the gate transistor 26 prior to terminating the generator signal applied to the gate circuit 1. This sequence of operation is effective to isolate the bistable circuit 31 from any transient signal produced by the operation of the gate circuit 1. This operation of the signal generator 1 is then effective to restore the condition of the gate circuit 1 and the output gate circuit 25 to that previously described.

As previously mentioned, a reset signal may be coupled to the bistable circuit 31 to restore a reference state prior to another sampling of the input signal. This reset signal may be derived from the signal generator 3 and may be related to the other signal generator signals mentioned above to reset the bistable circuit 31 either after the restoration of the energizing signal to the gate transistor 26 or before the application of the generator signal to the gate circuit 1.

Thus, it may be seen that there has been presented, in accordance with the present invention, a polarity-decision amplifier which is characterized by the ability to detect the instantaneous polarity of an input signal applied thereto.

What is claimed is:

1. A polarity-decision amplifier comprising a signal amplifying means, an input gate means for normally establishing a signal bypass path for an input signal whereby to prevent said input signal from affecting said amplifying means, a signal polarity responsive means, an output gate means connected between said amplifying means and said responsive means for normally establishing a signal bypass path for an output signal from said amplifying means whereby to prevent said output signal from affecting said responsive means, and bias signal supply means for supplying bias signals for selectively affecting said normal operation of said input gate means and said output gate means whereby to allow said input signal to be applied to said polarity responsive means, said bias signal supply means being operative to selectively terminate and restore said normal condition of said output gate circuit within the time interval between a selective termination and restoration of said normal operation of said input gate circuit.

2. A polarity-decision amplifier comprising a signal generator for selectively and successively supplying two bias signals, a pair of input signal terminals for connection to a source of input signals, an amplifying means having a pair of input terminals and a pair of output terminals, input gate means connecting said input signal terminals with said input terminals, said gate means including a first transistor circuit between said input signal terminals, signal supply means for supplying a bias signal to said transistor circuit whereby to maintain said circuit in a conducting state so as to bypass said input signals without affecting said amplifying means, a bistable polarity-responsive circuit, output gate means connected between said bistable circuit and said output terminals, said output gate means including a second transistor circuit between said output terminals for bypassing an output signal from amplifying means without affecting said bistable circuit, first circuit means connecting one of said generator output signals to said second transistor circuit whereby to terminate a conducting condition thereof and second circuit means connecting the other of said generator output signals to said first transistor circuit to oppose said bias signal whereby to terminate said conducting state of said first transistor circuit said signal generator being operative to selectively terminate and restore said conducting state of said second transistor circuit within the time interval between a selective termination and restoration of said conducting state of said first transistor circuit.

References Cited in the file of this patent

UNITED STATES PATENTS

| | | |
|---|---|---|
| 2,864,950 | Pernick | Dec. 16, 1958 |
| 2,891,171 | Shockley | June 16, 1959 |
| 2,936,338 | James et al. | May 10, 1960 |
| 2,995,664 | Deuitch | Aug. 8, 1961 |
| 2,995,735 | Frank | Aug. 8, 1961 |
| 3,017,524 | Koletsky et al. | Jan. 16, 1962 |

OTHER REFERENCES

Hurley: Junction Transistor Electronics, Wiley & Sons, 1958, (2nd printing 1959) (page 340 relied on).

Glasoe et al.: Pulse Generators, McGraw-Hill, 1948 (No. 5 Radiation Laboratory Series) (page 689 relied on).